US005469298A

United States Patent [19]

Suman et al.

[11] Patent Number: 5,469,298
[45] Date of Patent: Nov. 21, 1995

[54] REFLECTIVE DISPLAY AT INFINITY

[75] Inventors: Michael J. Suman, Holland; Russell L. Clark, West Olive; Richard M. Ferrell, Livonia, all of Mich.

[73] Assignee: Prince Corporation, Holland, Mich.

[21] Appl. No.: 745,484

[22] Filed: Aug. 14, 1991

[51] Int. Cl.$^6$ ............... G02B 27/14; G02B 7/182; G03B 21/00
[52] U.S. Cl. .............. 359/630; 359/631; 359/632; 359/838; 359/869; 359/872; 353/13; 353/14; 345/7; 345/75; 296/37.7; 296/37.8
[58] Field of Search .................. 359/630, 631, 359/632, 838, 871, 872, 869; 340/705; 296/37.7, 37.8; 353/13, 14; 345/7, 75

[56] References Cited

U.S. PATENT DOCUMENTS

| Re. 32,576 | 1/1988 | Pastore | 350/600 |
|---|---|---|---|
| 1,522,241 | 1/1925 | Hennessey . | |
| 1,528,082 | 3/1925 | Schlaich . | |
| 3,620,601 | 11/1971 | Waghorn | 359/630 |
| 3,774,996 | 11/1973 | Donnelly | 359/861 |
| 3,851,304 | 11/1974 | Picardat | 359/630 |
| 3,945,716 | 3/1976 | Kinder | 340/705 |
| 3,950,081 | 4/1976 | Yamashita et al. | 359/861 |
| 4,383,740 | 5/1983 | Bordovsky | 350/504 |
| 4,424,631 | 1/1984 | Franks . | |
| 4,499,451 | 2/1985 | Suzuki et al. | 340/98 |
| 4,505,054 | 3/1985 | Clark et al. | 33/357 |
| 4,546,551 | 10/1985 | Franks | 33/356 |
| 4,558,899 | 12/1985 | Chu et al. . | |
| 4,581,827 | 4/1986 | Higashi | 33/333 |
| 4,588,267 | 5/1986 | Pastore . | |
| 4,600,271 | 7/1986 | Boyer et al. | 359/630 |
| 4,630,904 | 12/1986 | Pastore | 350/600 |
| 4,677,381 | 6/1987 | Geerlings | 324/253 |
| 4,738,481 | 4/1988 | Watjer et al. . | |
| 4,739,224 | 4/1988 | Geerlings | 315/84 |
| 4,742,389 | 5/1988 | Schiffman | 358/103 |
| 4,775,218 | 10/1988 | Wood et al. | 359/630 |
| 4,790,613 | 12/1988 | Moss | 350/3.7 |
| 4,806,904 | 2/1989 | Watanuki | 340/103 |
| 4,818,048 | 4/1989 | Moss | 350/3.7 |
| 4,831,366 | 5/1989 | Iino | 340/705 |
| 4,837,551 | 6/1989 | Iino | 340/705 |
| 4,876,594 | 10/1989 | Schiffman | 358/103 |
| 4,882,565 | 11/1989 | Gallmeyer | 340/461 |
| 4,884,135 | 11/1989 | Schiffman | 358/103 |
| 4,953,305 | 9/1990 | Van Lente et al. | 33/356 |
| 4,962,998 | 10/1990 | Iino | 359/630 |
| 4,973,139 | 11/1990 | Weinhrauch et al. . | |
| 4,988,976 | 1/1991 | Lu . | |
| 5,037,182 | 8/1991 | Groves et al. | 359/630 |
| 5,044,709 | 9/1991 | Smith et al. . | |
| 5,053,755 | 10/1991 | Smith et al. . | |
| 5,061,996 | 10/1991 | Schiffman . | |
| 5,070,323 | 12/1991 | Iino et al. . | |

FOREIGN PATENT DOCUMENTS

| 0154117 | 6/1989 | Japan | 359/630 |
|---|---|---|---|
| 1131293 | 10/1968 | United Kingdom | 359/630 |

*Primary Examiner*—Ricky D. Shafer
*Attorney, Agent, or Firm*—Price, Heneveld, Cooper, DeWitt & Litton

[57] ABSTRACT

A vehicle includes a mirror mounted near the roof for reflecting an image generated by a display source. The display source and mirror are shaped and positioned to provide a virtual image of the image generated by the display source which is focused at infinity.

10 Claims, 5 Drawing Sheets

REFLECTIVE DISPLAY AT INFINITY

BACKGROUND OF THE INVENTION

The present invention pertains to a vehicular display providing information to a driver of the vehicle, and more particularly to a vehicular display in an overhead console.

It is desirable to display vehicle information such as the vehicle's directional heading, outside temperature, inside temperature, vehicle speed, keyless entry training information, and other information to the driver of the vehicle. The information is preferably displayed at a location which is both convenient for the driver of the vehicle and does not interfere with the driver's field of vision through the windshield. Ideally, the driver should not be required to look away from the road for long periods of time in order to read the display information.

Some rearview mirror assemblies integrally include a display of information such as the time, warnings of low oil pressure, excessive water temperature, low fuel level, and seat belts unfastened. The information displayed in the rearview mirror is convenient for drivers of the vehicles as they are accustomed to looking at the mirror while operating the vehicle. However, the information display reduces the reflective surface area of the mirror and thus interferes with the driver's rear vision.

A particularly advantageous display location is above the rearview mirror in a rearview mirror assembly. An example of a display above the mirror in a rearview mirror assembly is disclosed in U.S. patent application Ser. No. 07/567,390 filed Aug. 14, 1990, entitled ELECTRICAL CONTROL SYSTEM FOR VEHICLE OPTIONS, and assigned to the present assignee. An information display above the mirror does not physically interfere with the driver's field of vision through the rearview mirror as the information display does not utilize the surface area of the mirror. Furthermore, the displayed information is convenient as it is directly above the reflective surface of the mirror.

Overhead consoles located above the rearview mirror and between the driver and passenger sunvisors also may include electronic displays for vehicle information. Examples of overhead consoles are disclosed in U.S. Pat. No. 4,505,054 entitled MAGNETIC SENSOR MOUNTING SYSTEM issued to Clark et al on Mar. 19, 1985; U.S. Pat. No. 4,546,551 entitled ELECTRIC CONTROL SYSTEM issued to Franks on Oct. 15, 1985; U.S. Pat. No. 4,677,381 entitled FLUXGATE SENSOR ELECTRICAL DRIVE METHOD AND CIRCUIT issued to Geerlings on Jun. 30, 1987. Each of these consoles includes a display located above the vehicle's rearview mirror. The display location is convenient for the driver of the vehicle and does not interfere with the driver's field of vision.

Although vehicle information displays in overhead consoles and above-the-mirror in mirror assemblies do not interfere with the driver's field of vision, the driver must focus on an image which is relatively close to the driver's head. Because the driver is typically looking down the road and focusing at objects a significant distance outside the vehicle just prior to reading the display, the driver cannot quickly and easily focus on the displayed information. Further, if the driver wears bifocals or trifocals, the driver must adjust his head position to bring the reading portion of his eyeglass lens into position for reading the display.

So-called heads-up vehicular displays include a half mirror or a partially reflective surface positioned within the driver's field of vision to display information to the driver of the vehicle. These systems provide a virtual image remote from the vehicle. However, these systems include a partially reflective surface within the driver's line of sight, such as on a dashboard or in the vehicle's windshield above the steering wheel. Thus, the displays may interfere with the driver's line of vision if the image in the reflective surface is strong. Further, the partially reflective surface is mounted on the windshield or the dashboard where ambient sunlight reduces the strength of the information image in the reflective surface and direct sunlight can completely obscure the image. If the image is weak, the driver has difficulty seeing the image on the reflective surface.

SUMMARY OF THE INVENTION

The system of the present invention represents an improvement over the prior art by displaying information at a location which does not interfere with the driver's field of vision and provides a virtual image remote from the vehicle. In a preferred embodiment of the present invention a curvilinear target mirror is mounted within a vehicle in an overhead position and reflects an image produced by a display source. With such a system, the virtual image of the display source image is remote from the vehicle. Accordingly, the driver does not have to focus at a relatively short distance to read the display after focusing on remote objects through the vehicle's windshield or rearview mirror even though the mirror is relatively close. This feature is particularly advantageous to drivers who wear bifocals or trifocals which must be physically moved to focus on objects at different distances. Additionally, the full mirror image is easily discerned in all ambient light conditions.

These and other features, objects and advantages of the present invention, will become apparent upon reading the following description thereof together with reference to the accompanying drawings in which:

DETAILED DESCRIPTION OF THE PREFERRED EMBODIMENT

Figure 1:
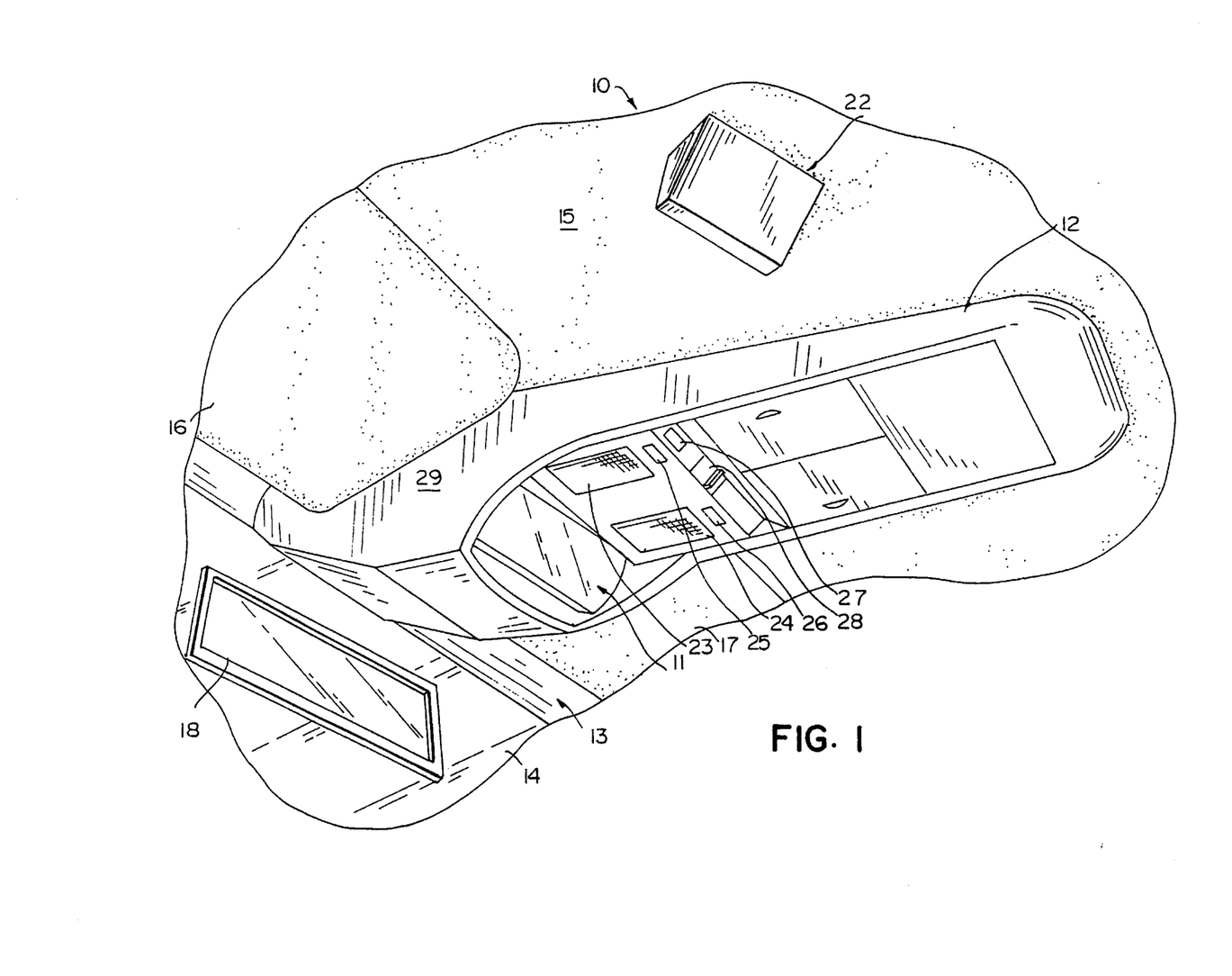
FIG. 1 is a fragmentary front perspective view of a vehicle headliner including a focus-at-infinity display embodying the present invention.

Referring initially to FIG. 1, there is shown an information display system 10 embodying the present invention and which includes a target mirror 11 which in the preferred embodiment is mounted within an overhead console 12 attached to the roof structure of a vehicle 13. Overhead console 12 is approximately centrally located adjacent the top edge of windshield 14, typically just above the rearview mirror 18 located between the driver sunvisor 16 and the passenger sunvisor 17. Target mirror 11 reflects an image generated by a display source assembly 22 such that the virtual image of the display source image seen in mirror 11 is remote from vehicle 13. Overhead console 12 also includes map/reading lamps 23 and 24 which are actuated by switches 25 and 26 respectively, a garage door opening transmitter (not shown), a switch 27 for actuating the garage door opening transmitter; and a three position code selection control switch 28 for operation of any one or more of three garage door receivers. Examples of overhead consoles including features other than the target mirror 11 are illustrated in U.S. Pat. No. 4,558,899 entitled COLLAPSIBLE VISOR issued on Dec. 17, 1985; and U.S. Pat. No. 4,738,481 entitled OVERHEAD CONSOLE OF A VEHICLE issued to Watjer et al on Apr. 19, 1988.

Figure 2:
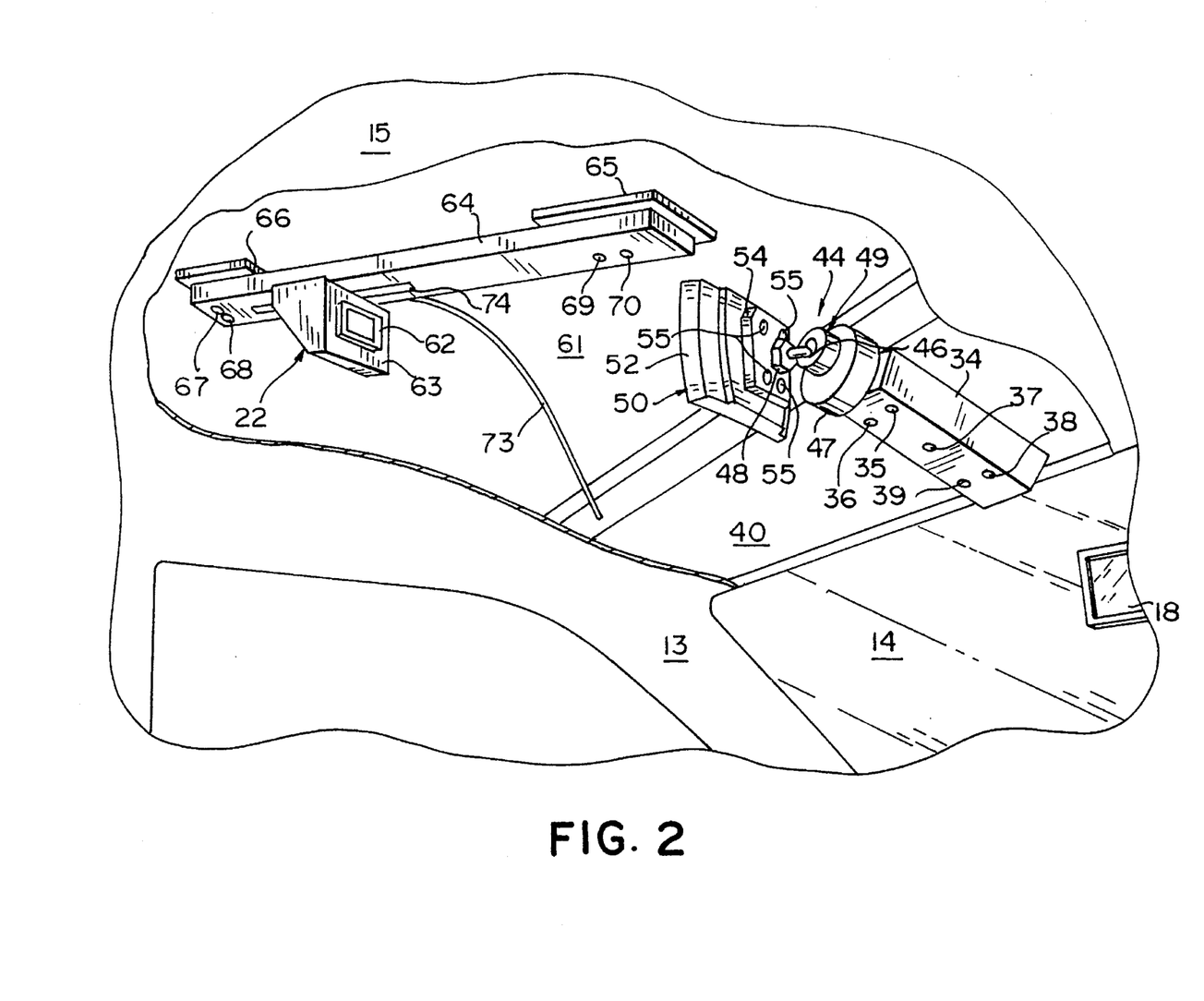
FIG. 2 is a rear perspective view, partly broken-away, of the components of the focus-at-infinity display embodying the present invention showing their mounting to the vehicle roof structure.

Mirror 11 is preferably adjustably mounted within an overhead console 12 as illustrated in FIG. 1 using a ball and socket adjustable mount as seen in detail in FIG. 2 which shows the structure with the console housing 29 removed and part of the headliner 15 broken away. A base 34 (FIG. 2) is attached to the roof header 40 of vehicle 13 by threaded fasteners 35–39 in a conventional manner. Header 40 in turn is welded to the roof 61 of vehicle 13. Mirror 11 is coupled to base 34 by a universal joint 44 to allow adjustment of the mirror. Joint 44 includes a ball 46 with a projecting arm 47 attached to a rear mounting bracket 48 of housing 50 for mirror 11. Ball 46 pivots within socket 49 secured to base 34 in a conventional manner. Housing 50 includes a frame 52 which surrounds and supports mirror 11 and a backing plate 54 to which bracket 48 is secured in a conventional manner. Plate 54 is secured to the rear of housing 50 by a plurality of fastening screws 55. The joint 44 and mirror housing thus is of the type used in connection with rearview mirrors to allow mirror 11 to pivot such that the driver of the vehicle can adjust the position of mirror 11 for an optimal view of the virtual image displayed.

Mirror 11 is preferably positioned within overhead console housing 29 below roof 61. Console housing 29 together with roof 61 shade mirror 11 from sunlight. Consequently, a clear, well-defined image is generated in mirror 11 regardless of ambient light conditions and the position of the sun.

In the preferred embodiment of the invention, mirror 11 is a spherically concave mirror having a focal length from 200 to 300 mm, and most preferably having a focal length of 250 millimeters. Mirror 11 has a magnification factor between 6 and 8, and in a preferred embodiment of the invention, has a magnification factor of 7. Mirror 11 is perferrably provided by reflective black acrylic which prevents multiple images from appearing on the reflector, and thus provides a single clear image. Mirror 11 has a height between 5 and 10 cm and a width between 10 and 15 cm, and most preferably has a height of 7.62 cm and a width of 12.7 cm. Design parameters for the manufacture of this mirror are set forth in the following Table 1:

TABLE 1

| NO. | CYCLE NUMBER = 0 | PHI VALUE = 0.00E+00 | | |
|---|---|---|---|---|
| | RADIUS | THICKNESS | GLASS | CA |
| 1 | | 700.00000 | | 130.77 |
| 2 | −500.00000 | .00000* | | 77.63 |
| 3 | | 1499.99988 | | 77.90 |

| CONIC CONSTANTS | | | |
|---|---|---|---|
| NO. | VALUE | NO. | VALUE |

TABLE 1-continued

| 2 | −6.00000E01 | | |
|---|---|---|---|

| POLYNOMIAL ASPHERS (COEFFICIENTS OF THE EVEN POWERED TERMS) | | | |
|---|---|---|---|
| NO. | AD(4TH) | AE(6TH) | AF(8TH) | AG(10TH) |
| 2 | 0.0000E+00 | 0.0000E+00 | 0.0000E+00 | 0.0000E+00 |
| | AH(12TH) | AI(14TH) | | |
| | 0.0000E+00 | 0.0000E+00 | | |

| SYSTEM FIRST ORDER PROPERTIES | | | |
|---|---|---|---|
| WAVELENGTHS | .54610 | .48000 | .64380 |
| OBJ. HT. | 3.0000 | | f/ 26.00 MAG 7.000 |
| STOP | .00 | AFTER SURF. 1 DIA. 130.77 |
| EFL 250.000 | FVD | 2200.00 ENP | .000000E+00 |
| IMD 1500.00 | BRL | 700.000 EXP | −388.889 |
| OBD 485.714 | OVL | 1714.29 | |

*REFLECTING SURFACE

Display source assembly 22 is also located in the roof area of a vehicle and is positioned to project an image onto mirror 11 for display to the operator. Assembly 22 includes a display source 62 located within a housing 63 attached to the roof 61 of vehicle 13. Display assembly 22 is preferably mounted within the housing 29 of the overhead console 12 (FIG. 1). Display housing 63 is coupled to support member 64 by a threaded fastener (not shown) which is received in slot 74 of support member 64 which is attached to spacers 65 and 66 by four threaded fasteners 67, 68, 69, 70. Spacers 65 and 66 are attached to roof 61 of vehicle 13 by an adhesive if the spacer is plastic, or by spot welding if the spacer is steel. Spacers 65 and 66 include threaded bores (not shown) which receive threaded fasteners 67–70.

The display source 62 is conventionally mounted on a printed circuit board 71 (FIG. 6*b*) in housing 63 to position the source 62, such as a vacuum fluorescent display, in a plane generally parallel to and facing mirror 11 to project a virtual image in target mirror 11 which is easily discerned by drivers regardless of their driving position and height. A fine focus adjustment device 65 (shown schematically in FIG. 6*b*), such as a hand wheel focus knob or a manually actuated electric motor, may be included in assembly 22 for adjusting the position of the display source 62. The fine adjustment moves the display housing 63 in slot 74 of support member 64 allowing the driver of the vehicle to precisely focus the image in target mirror 11 for their particular driving position.

Display source 62 generates an object image of information such as the vehicle heading, the vehicle speed, keyless entry training information, garage door opener training information, outside temperature, and inside temperature, as well as warnings such as excessive water temperature, low oil pressure, alternator, seat belt unfastened and low fuel level. Display source 62 is most preferably a vacuum fluorescent display controlled by a driver circuit 75 (FIG. 6*b*) mounted on circuit board 71 in housing 63. In a preferred embodiment of the invention, a display source 62 for displaying vehicle heading information and exterior temperatures includes 3 characters, each of which is 8 mm high for generating alphanumeric vehicle heading information or numeric temperature information. It also includes 3 fixed characters which are 3 mm high for displaying a calibration indication "CAL", and finally, a temperature indicator including a 2 mm circle and an overlaid character which is 4 mm high, the circle and overlaid character selectively forming "°C." or "°F.". The total width of all the characters is 24 mm. The display produces a light image having a brightness between 600 and 1200 foot Lamberts, and most preferably outputs an image with a brightness of 900 foot Lamberts. The display uses blue/green phosphorous, although other phosphorous colors may be used. Circuit 75 is electrically connected to the vehicle's electrical system by cable 73. A particularly advantageous control circuit 75 for display assembly 22 is disclosed in U.S. patent application Ser. No. 07/567,390 filed on Aug. 14, 1990 and entitled ELECTRICAL CONTROL SYSTEM FOR VEHICLE OPTIONS, the disclosure of which is incorporated herein by reference.

Figure 3:
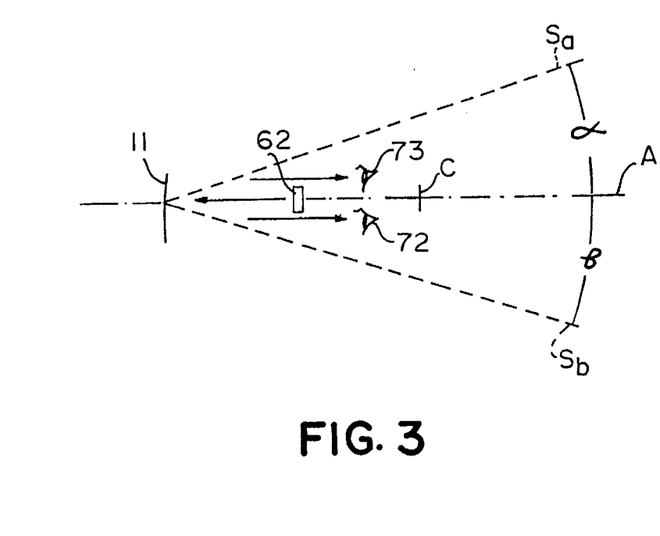
FIG. 3 is a schematic diagram of the display source, target and driver illustrated from the top.

Display source 62 is preferably positioned approximately halfway between center C (FIG. 3), which is the center of the sphere formed by extending spherically concave mirror 11 into a complete sphere, and mirror 11. Axis A extends through the center of mirror 11 and display source 62. The driver's left eye 72 and right eye 73 are illustrated on opposite sides of axis A in FIG. 3. However, the image in target 11 remains clear so long as both of the driver's eyes 72 and 73 remain within the area defined by sides Sa and Sb of angles α and B. For the 7.62 cm×12.7 cm mirror used in the prefered embodiment, angles α and B are 15°. Angles α and B are increased by using a larger mirror. If one of the driver's eyes moves beyond the area defined by angles α and B, the driver will see a double image in mirror 11.

Figure 4:
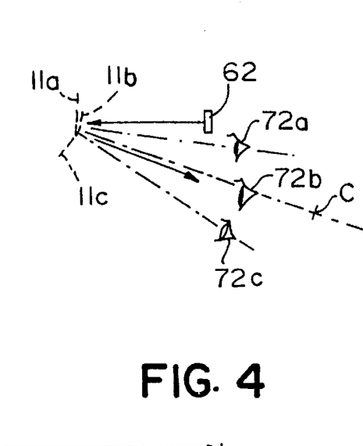
FIG. 4 is a schematic diagram of the display source, target and driver illustrated from the side.

With reference to FIG. 4, the vehicle driver's left eye 72 is positioned below mirror 11. The display source 62 is positioned below roof 61 such that as mirror 11 is adjusted for drivers with different heights, the image from display source 62 will remain in mirror 11. Thus, display source 62 is positioned adjacent roof 61 to insure that the display source is not positioned directly between the driver and mirror 11 when a tall driver is operating vehicle 13. Accordingly, display source assembly 22 does not block the image in mirror 11 when a tall driver 72a (FIG. 4) is operating vehicle 13 and adjusts the mirror to position 11a. For short drivers, represented by left eye 72c, the mirror is adjusted to position 11c. An average height driver 72b adjusts mirror 11 to the central position represented by mirror position 11b. Consequently, tall drivers 72a see the image of the display source 62 in lower reflective surface area of mirror 11 whereas a driver of average height 72b sees the image in the central surface area of the mirror and a short driver 72a sees the image in the upper reflective surface area of mirror 11.

Figure 5:
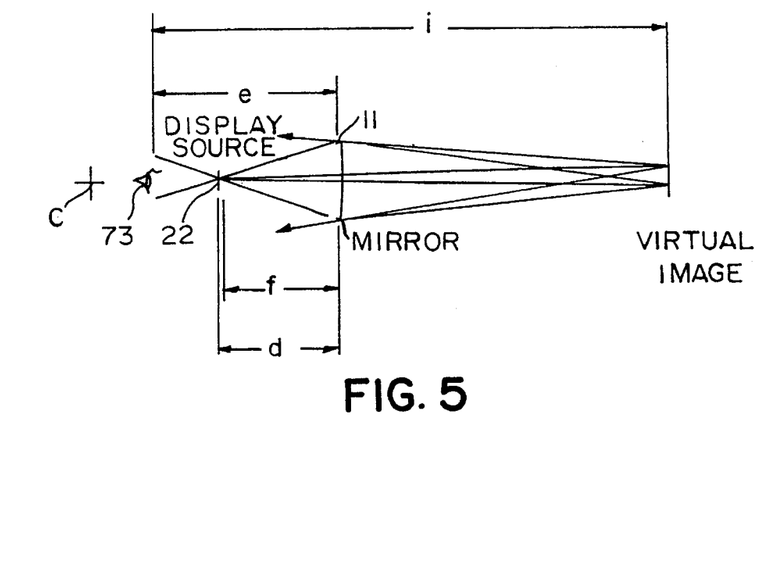
FIG. 5 is a schematic diagram of the optical system of the present invention; and FIG. 6a and FIG. 6b is an electrical circuit diagram, partly in block and schematic form, of a programmable control circuit and transceiver for the display system of the present invention.

The relationship between the position of the display at infinity mirror 11 and the virtual image (FIG. 5) is defined by the following equation:

$$\frac{1}{f} = \frac{1}{d} + \frac{1}{i}$$

where: f is the focal length of mirror 11 (f=½ the radius of a spherical mirror); d is distance from object to mirror; and i is distance from mirror to the virtual image. Thus, the virtual image is a distance "e" between the driver's eyes and mirror 11 plus a distance "i" between mirror 11 and the virtual image. In one implementation of display according to the invention, the distance between the display source 62 and the target 11 is approximately 30.5 cm and the focal length for the spherical mirror 25 cm. Thus, the distance from the eye position to the virtual image is greater than 122 cm and the virtual image will appear to be at infinity.

Figure 6A:
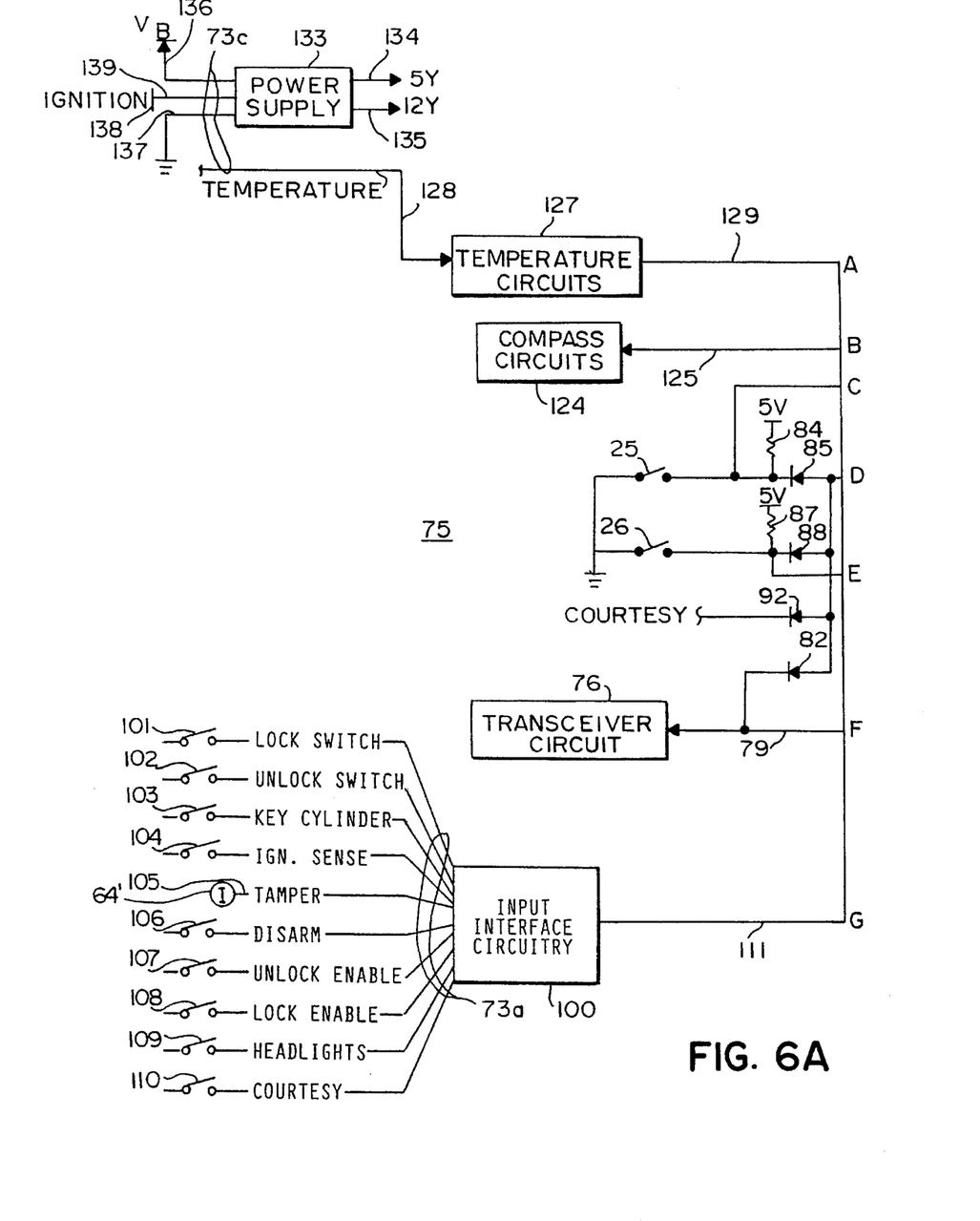
Figure 6B:
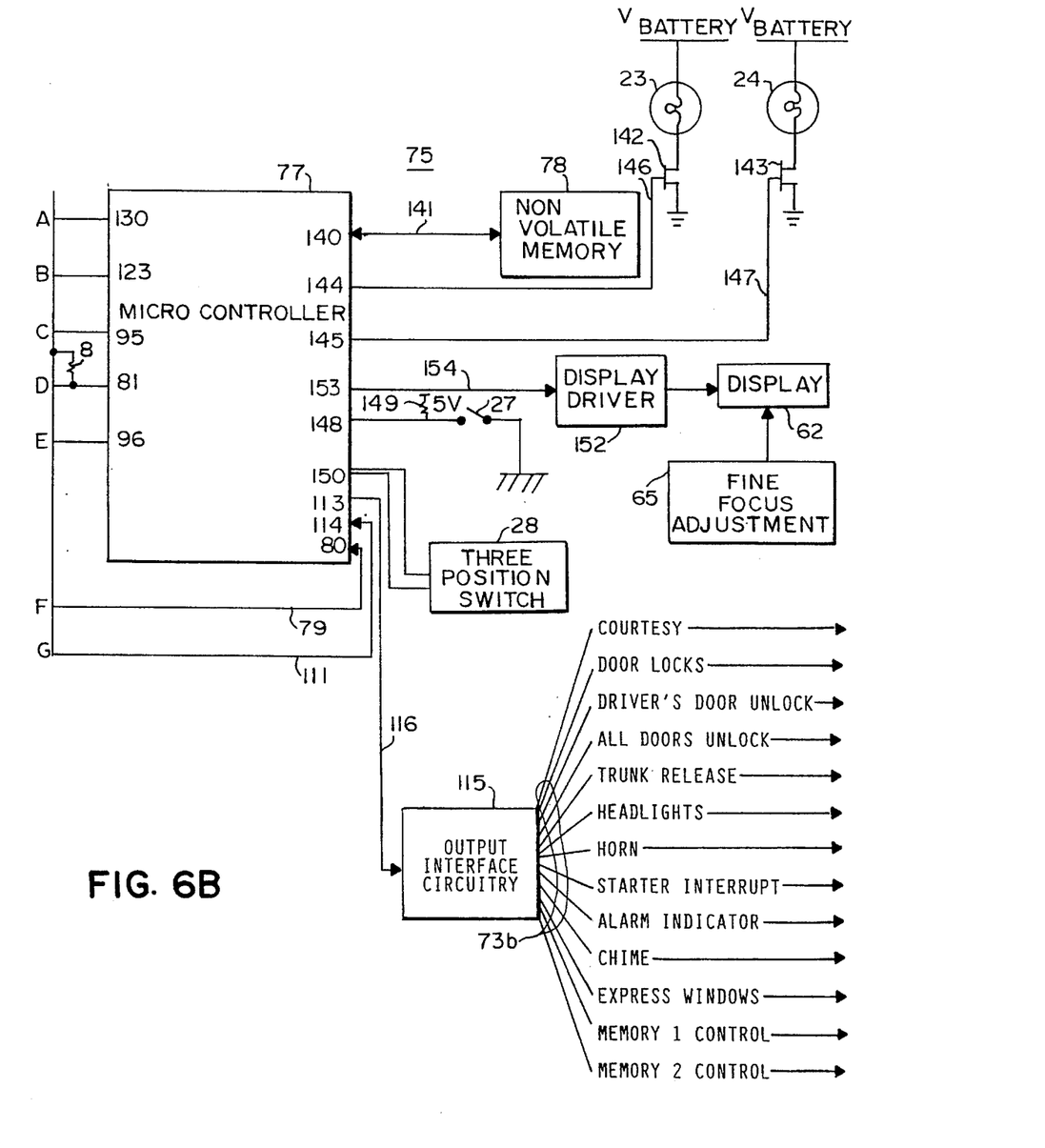

Having described the overall preferred display system and its relationship to the vehicle, a description of a circuit 75 for driving the display source is now presented in connection with the circuit diagrams of FIGS. 6a and 6b.

The radio frequency transceiver circuit 76 (FIG. 6a) is mounted within the housing 63 of display assembly 22.

Transceiver circuit 76 receives radio frequency signals from a remote keyless transmitter (not shown) and garage door opening remote control transmitters (not shown). The radio frequency circuit 76 also transmits radio frequency signals to a receiver to activate garage door opening mechanisms (not shown) responsive to a GDO switch 27 (FIG. 6b) and a three position switch 28. Three position switch 28 is used to select the frequency or the digital code of the signal transmitted by transceiver 76. A particularly advantageous radio frequency transceiver circuit is disclosed in U.S. patent application Ser. No. 07/567,390 filed on Aug. 14, 1990 and entitled ELECTRICAL CONTROL SYSTEM FOR VEHICLES, the disclosure of which is incorporated herein by reference.

A microcontroller 77 (FIG. 6b) controls the circuit operation and may be a commercially available IC 68HC05B6, which includes a nonvolatile memory 78; however, any appropriate microprocessor may be used. Transceiver circuit 76 is connected to nine terminals 80 of a microcontroller 77 through 9 conductors in cable 79. The 9 conductors include 7 frequency and/or code selection conductors for coupling a control signal from microcontroller 77 to transceiver 76 which controls the frequency or code of the signal generated by the transceiver. The 9 conductors also include an input conductor for coupling an activation signal from the microcontroller to transceiver 76 and output conductor for coupling a detection signal from transceiver 76 to microcontroller 77. The activation signal from microcontroller 77 controls transceiver 76 to transmit a signal for activating a garage door opening mechanism.

An interrupt input terminal 81 of microcontroller 77 is connected to receive interrupt signals from several input sources. Thus, the output conductor from transceiver 77 in cable 79 is connected via a diode 82 to interrupt input terminal 81 of the microcontroller. Interrupt input terminal 81 is also coupled to a left map lamp switch 25 through a pull-up resistor 84 and a diode 85. A right map lamp switch 26 is similarly coupled to interrupt input terminal 81 of microcontroller 77 via a pull-up resistor 87 and a diode 88. The cathodes of diodes 85 and 88 will be held at a high logic level (approximately 5 volts) by pull-up resistors 84 and 87, respectively, until switch 25 or switch 26 is closed, which will lower the cathode potential to a low logic level (ground potential). A courtesy input 90 is coupled to interrupt input terminal 81 of microcontroller 77 via pull-up resistor 91 and a diode 92. Courtesy input 90 is connected to courtesy switch 110. Pull-up resistor 91 holds the cathode of diode 92 at a high logic level when the vehicle doors are closed. When one or more of the vehicle doors are open, courtesy input 90 will have a low logic level thereon, which will cause the cathode of diode 92 to be at a low logic level. Thus it can be seen that pull-up resistor 91 holds input terminal 81 high until the cathode of one of the diodes, 82, 85, 88, or 92, is brought to a low logic level, which will cause the diode having a low logic level on the cathode to be forward biased to pull input terminals 81 to a low logic level.

Switch 25 is connected to left map lamp input terminal 95 and switch 26 is connected to right map lamp input terminal 96. Input terminals 95 and 96 of microcontroller 77 will have low logic levels thereon when switches 25 and 26, respectively, are closed. Microcontroller 77 is connected to the courtesy switch 110 via interface circuit 100. The microcontroller input connected to courtesy switch 110 has a low logic level thereon when the courtesy input is at a low logic level indicating one of the vehicle doors is open. Microcontroller 77 is connected to the output lead of from transceiver circuit 76 in cable 79. The transceiver outputs a low logic level signal to one of terminals 80 of microcontroller 77 when an RF signal is detected by transceiver 76. The microcontroller is responsive to an interrupt, which will be detected by interrupt terminal 81 having a low logic level thereon, for reading input terminals 80, 95, 96 and 114 to determine the source of the interrupt. The microcontroller will then control the map lamps, the transceiver, etc. . . . , on the basis of which input terminal, 80, 95, 96 or 114 has a low logic level thereon simultaneously with the interrupt input terminal 81.

An interface circuit 100 is connected to the vehicle electrical system via wiring harness 73a and to microcontroller 77 via data bus 111 to couple input signals to the microcontroller. Switches 101 and 102 provide information indicating the locked condition of the vehicle doors to the microcontroller. Interface circuit 100 connects a key cylinder switch 103 to microcontroller 77 whereby microcontroller 77 detects the existence of an ignition key in the cylinder. The ignition-on sensor switch 104 and a motion detecting tamper switch 105 are coupled to microcontroller 77 through interface circuit 100. An alarm disarm switch 106 is connected to microcontroller 77 responsive to which the microcontroller disarms the security alarm when a key is used to unlock the driver or front passenger door. The unlock and lock enable switches 107 and 108 are associated with a gear shift lever for providing a park position and a drive position control signal to the microcontroller. A headlight on switch 109 provides information regarding the headlight activation condition to microcontroller 77. The courtesy light switch 110 provides a signal indicating all the status of the vehicle doors. All of these input switches provide a binary 0 or 1 through their coupling to ground or +5 volts depending on their state of actuation to provide a ten-bit binary signal to the microcontroller input terminals 102 which responds to provide a variety of control functions through a conventional output interface circuit 115 output interface 115 is connected to the vehicle electrical system via wiring harness 73b. A data bus 111 comprises eleven parallel data lines for each of the inputs 100–110 which is connected to a respective one of eleven input terminals 114.

The microcontroller 77 includes thirteen output terminals 113 connected by thirteen parallel output conductors in data bus 116 to output interface circuit 115 which comprises a plurality of driver amplifiers such as FET amplifier circuits for providing control output signals. The control output signals are used either directly for controlling vehicle controlled devices such as courtesy lights or for activating existing vehicle control circuits such as a horn relay, a trunk release relay, door locks, ETC. The various outputs are specifically labeled for one embodiment of circuit 75, it being understood that circuit 115 comprises a driver circuit of suitable current carrying capacity for each of the output conductors associated with each of the controlled items indicated. Data bus 116, therefore, comprises a parallel dataline for each of the controlled outputs such that more than one can be actuated at the same time.

Microcontroller 77 provides a keyless entry system responsive to a remote transmitter (not shown) for unlocking the driver door only, the driver and passenger door, the vehicle trunk, or locking all the vehicle doors. Keyless entry functions optionally include automatic locking of the vehicle doors when the vehicle's transmission is placed in park; all doors are locked after a predetermined delay; all doors of vehicle 13 are locked when the last door is closed; walkaway lighting; a security alarm; and illuminated entry. A particularly advantageous keyless entry system is disclosed in U.S. patent application Ser. No. 07/467,541 entitled VEHICLE SYSTEMS CONTROL filed Jan. 19, 1990, the disclosure of which is incorporated herein by reference.

Four terminals 123 of microcontroller 77 are connected to an electromagnetic field sensor 124 through four parallel conductors in a cable 125. Particularly effective compass circuits for generating the vehicle heading information are described in detail in U.S. Patent CONTINUOUS CALIBRATION issued on Sep. 4, 1990; U.S. Pat. No. 4,953,305 entitled VEHICLE COMPASS WITH AUTOMATIC U.S. Pat. No. 4,546,551 entitled ELECTRICAL CONTROL SYSTEM, issued Oct. 15, 1985; and U.S. Pat. No. 4,424,631 entitled ELECTRICAL COMPASS, issued Jan. 10, 1984, the disclosures of which are incorporated herein by reference.

Signals from one or more temperature sensors (not shown) mounted externally and/or internally to vehicle 13 are connected to a temperature circuit 127 via a conductor 128. Temperature circuit 127 in turn couples an output signal on conductor 129 to the temperature input terminal 130 of the microcontroller. Temperature sensors may be provided in the form of thermistors, and temperature circuit 128 may comprise a buffer for interfacing between the sensor(s) and microcontroller input terminal 130.

A power supply 133 provides a regulated +5 VDC reference potential on terminal 134 and a regulated +12 VDC reference potential on terminal 135. Circuits for providing the regulated voltages are well known and accordingly will not be described in further detail herein. Power supply 133 receives power from the vehicle battery $V_B$ via a battery conductor 136 and a ground conductor 137. A vehicle ignition signal is applied to power supply 133 at ignition sense input terminal 138 through conductor 139. Wiring harness 73c includes conductors 136, 137, 139 and 128.

A nonvolatile memory (NVM) 78 is connected to input/output terminals 140 of microcontroller 77 via a bidirectional bus 141, and retains status information when the ignition of vehicle 13 is turned off. FET switches 142 and 143 are connected to output terminals 144 and 145 of microcontroller 77 via conductors 146 and 147. Output signals from terminal 144 of the microcontroller 77 control map lamp switch 26 is actuated or courtesy input 110 changes switch 142 to actuate left map lamp 23 when either the left state. Output 145 controls switch 143 to actuate right map lamp 24 when either the right map lamp switch 25 or courtesy input 110 changes state.

A garage door opener (GDO) switch 27 is connected to a GDO switch input terminal 148 of microcontroller 77 via a pull-up resistor 149. Switch 27 controls the microcontroller to train to a remote transmitter of a garage door mechanism or to transmit a stored control signal for a garage door mechanism. A three position slide switch 28 is connected to input terminals 150 of microcontroller 77. The slide switch positions correspond to memory locations for GDO control signals. Accordingly, a signal to be transmitted by the trainable transmitter will be retrieved from the memory location corresponding to the switch position.

Display 62 generates the source image for information display system 10. Display 62 may be provided by a vacuum fluorescent display which draws a large current (on the order of 150 mA). Display driver 152 is connected to output 153 of microcomputer 77 via bus 154. The display circuit includes a transistor which will disconnect the display driver to eliminate the large current drain when the vehicle is not turned on. The vacuum fluorescent display source 62 is preferably a reverse display such that the reflected image in target mirror 11 is readable to the driver of the vehicle 13. Display source 62 preferably includes alphanumeric, numeric and warning symbols. The warning symbols include excessive water temperature, low oil pressure, low fuel, seat belts unfastened and emergency brake actuated. The alphanumeric and numeric characters display vehicle heading information such as N, S, NE, SE, NNE, SSE, etc., the speed of vehicle 13; the interior and exterior ambient temperatures; and training information. The display thus displays information which informs the driver of a variety of parameters and that the garage door opener circuit has trained to a remote control transmitter; that the vehicle security alarm is activated; that the doors of vehicle 13 are locked; and that last door closed will lock all the doors of the vehicle responsive to control from keyless entry circuit 13.

Programs for microcontroller 77 are shown in co-pending patent applications Ser. No. 07/567,390 entitled ELECTRICAL CONTROL SYSTEM FOR VEHICLE OPTIONS and Ser. No. 07/467,541 entitled VEHICLE SYSTEMS CONTROL, the disclosures of which are incorporated herein by reference.

In operation, upon entering the vehicle, the driver of the vehicle adjusts the rearview mirror 15 and the display at infinity mirror 11 for the operators driving position. Mirror 11 magnifies the image and presents a virtual image of the display information which is remote from the vehicle. The display at infinity mirror 11 is positioned above rearview mirror 15 in a position where it may be viewed by the driver of the vehicle without taking his or her eyes off the road for an extended period of time. Because vehicle operators are typically in the habit of looking at the rearview mirror, looking above the rearview mirror to view the image reflected by mirror 11 does not interfere with typical driving habits. Additionally, the placement of mirror 11 is out of the line of sight of the driver of the vehicle, and thus will not distract the operator of vehicle 13 during normal operation of the vehicle. Target mirror 11 is also positioned below the vehicle roof in such a manner that the vehicle roof shades the reflective surface from incident sunlight.

Thus it can be seen that a display is disclosed which provides vehicle information to the driver in a convenient and safe location. Additionally, the mirror provides a display which is focused at infinity such that the driver of the vehicle will not have to focus at a close object to view the information display. This is especially advantageous to persons who wear bifocals or trifocals as the same portion of their eyeglass lens may be used to view the display as is used for viewing objects outside the vehicle.

It will become apparent to those skilled in the art the various modifications to the preferred embodiment of the invention as described herein and can be made without departing from the spirit or scope of the invention as defined by the appended claims.

The embodiments of the invention in which an exclusive property or privilege is claimed are defined as follows:

1. A focus at infinity display for a vehicle comprising:

an overhead console including a housing adapted to be mounted to a vehicle's roof structure;

a display assembly adapted to be mounted to said vehicle's roof structure, said display assembly including a display source producing an information image; and a non-transparent spherical target mirror positioned within said overhead console housing, said target mirror having a reflecting surface facing a driver position and said display source for reflecting said information image whereby said overhead console and said display assembly are mounted to the vehicle's roof structure and said mirror is positioned in said overhead console such that the virtual image of said information image viewed by a driver of the vehicle viewing said mirror is substantially greater than the distance from the driver's eye to the mirror; and further including a base positioned within said overhead console, said mirror pivotally attached to said base whereby the driver may adjust the position of said mirror for different driving positions of the driver of the vehicle.

2. The focus at infinity display as defined in claim 1 further including means for adjusting the position of said display source to focus the virtual image viewed by the driver.

3. A focus at infinity display for a vehicle comprising:

an overhead console including a housing for mounting to a vehicle's roof structure;

a display assembly for mounting to said vehicle's roof structure, said display assembly including a display source producing an information image; and a target reflective member mounted within said overhead console housing and reflecting the image of said display source to provide a virtual image of the information to be viewed by a driver of the vehicle which is remote from the vehicle, wherein said reflective target is a spherical, concave shaped mirror having a focal length of about 250 millimeters; and a base attached to the roof structure, said mirror pivotally attached to said base whereby a driver of the vehicle may adjust the position of the mirror for different driving positions of the driver of the vehicle; and wherein the position of said display source is adjustable to focus the virtual image viewed by the driver of the vehicle.

4. The focus at infinity display as defined in claim 3 wherein said mirror has a magnification of 7.

5. The focus at infinity display as defined in claim 4 wherein said display source is a vacuum fluorescent display.

6. A focus at infinity display for a vehicle comprising:

an overhead console including a housing adapted to be mounted to a vehicle's roof structure;

a display assembly adapted to be mounted to said vehicle's roof structure, said display assembly including a display source producing an information image;

a non-transparent spherical target mirror adapted to be positioned within said overhead console housing, whereby said overhead console and said display assembly are mounted to said vehicle roof structure and said mirror is positioned in said console such that said target mirror has a reflecting surface facing a driver position and said display source reflects said information image and the virtual image of said information image viewed by a driver of the vehicle viewing said mirror is greater than the sum of the distance between the driver's eyes and the mirror and the distance between the display source and the mirror; and wherein said display source is a vacuum fluorescent display.

7. A focus at infinity display for a vehicle comprising:

an overhead console including a housing adapted to be mounted to a vehicle's roof structure;

a display assembly adapted to be mounted to said vehicle's roof structure, said display assembly including a display source producing an information image;

a non-transparent spherical target mirror adapted to be positioned within said overhead console housing, said target mirror having a reflecting surface facing a driver position and said display source for reflecting said information image such that the distance from the virtual image of said image viewed by a driver of the vehicle viewing said mirror is greater than the distance between the vehicle operator and the mirror;

whereby said overhead console and said display assembly are mounted to said roof structure and said mirror is mounted in said overhead console at a position above a rearview mirror and between vehicle sunvisors such that the vehicle driver viewing said mirror sees a reflection of said virtual image in said mirror which has an altered focal distance.

8. A vehicle headliner display assembly comprising:

a display means mounted to a vehicle's roof structure;

a mirror mounted to said vehicle's roof structure whereby an image generated by said display means is reflected by said mirror to significantly alter the focal distance of the image as perceived by a driver of the vehicle, wherein said mirror is a concave mirror having a focal length of approximately 250 millimeters;

a base attached to said roof structure, said mirror pivotably attached to said base whereby a driver of the vehicle may adjust the position of the mirror for different driving positions; and wherein the position of said display means is adjustable to focus the virtual image viewed by a driver of the vehicle.

9. The vehicle headliner display as defined in claim 8 wherein said mirror has a magnification of 7.

10. The vehicle headliner display as defined in claim 9 wherein said display means includes a vacuum fluorescent display.

* * * * *

UNITED STATES PATENT AND TRADEMARK OFFICE
CERTIFICATE OF CORRECTION

PATENT NO. : 5,469,298  
DATED : November 21, 1995  
INVENTOR(S) : Micheal J. Suman et al.

Page 1 of 2

It is certified that error appears in the above-indentified patent and that said Letters Patent is hereby corrected as shown below:

Column 3, line 8;
   "shown),a" should be --shown), a--.

Column 5, line 19;
   "cmx12.7" should be --cm x 12.7--.

Column 6, line 33;
   "transceiver 77" should be --transceiver 76--.

Column 6, line 66;
   delete "from".

Column 7, line 8;
   "terminal, 80," should be --terminal 80,--.

Column 7, line 36;
   "circuit 115 output interface 115" should be
   --circuit 115. Output interface 115--.

Column 7, line 49;
   "ETC." should be --etc.--.

Column 8, lines 7-9;
   "U.S. Patent CONTINUOUS . . . AUTOMATIC U.S." should be
   --U.S. Patent No. 4,953,305 entitled VEHICLE COMPASS
   WITH AUTOMATIC CONTINUOUS CALIBRATION, issued Sept.
   4, 1990; U.S.--.

UNITED STATES PATENT AND TRADEMARK OFFICE
CERTIFICATE OF CORRECTION

PATENT NO. : 5,469,298
DATED : November 21, 1995
INVENTOR(S) : Micheal J. Suman et al.

It is certified that error appears in the above-indentified patent and that said Letters Patent is hereby corrected as shown below:

Column 8, line 61;
    "microcomputer 77" should be --microcontroller--.

Signed and Sealed this

Twenty-fifth Day of June, 1996

Attest:

BRUCE LEHMAN

*Attesting Officer*      *Commissioner of Patents and Trademarks*